T. W. AND M. L. BIBB.
CREAM SEPARATOR.
APPLICATION FILED FEB. 4, 1920.

1,369,607.

Patented Feb. 22, 1921.
2 SHEETS—SHEET 1.

Inventors
Thomas W. Bibb
and Martin L. Bibb
By Mason Fenwick & Lawrence,
Attorneys

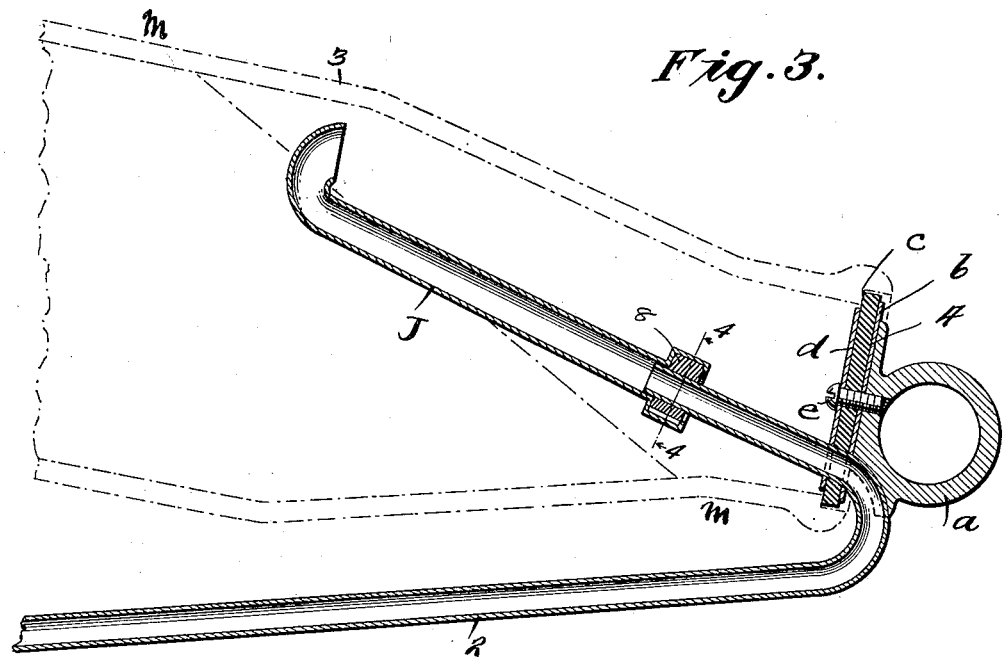

UNITED STATES PATENT OFFICE.

THOMAS W. BIBB, OF MONTESANO, AND MARTIN L. BIBB, OF OLYMPIA, WASHINGTON.

CREAM-SEPARATOR.

1,369,607.  Specification of Letters Patent.  Patented Feb. 22, 1921.

Application filed February 4, 1920. Serial No. 356,136.

*To all whom it may concern:*

Be it known that we, THOMAS W. BIBB and MARTIN L. BIBB, citizens of the United States, residing at Montesano and Olympia, respectively, in the counties of Grays Harbor and Thurston, respectively, and State of Washington, have invented certain new and useful Improvements in Cream-Separators; and we do hereby declare the following to be a full, clear, and exact description of the invention, such as will enable others skilled in the art to which it appertains to make and use the same.

This invention relates to cream separators and while particularly adapted to siphoning of cream from bottles is not limited thereto.

An object of this invention is to provide a cream separator in which the flow of cream is started by gravity to act upwardly acting directly upon the cream.

In previous siphoning devices for separating cream one of the impractical features of the device has been the means of starting the flow of the cream, for which various expedients have been used, such as air pressure and the like, which has made such a cumbersome and expensive and complicated device as to render it of little value for usual household use. An object of this invention is to simplify the structure of a cream separator of this character and to provide a structure in which the tube crosses the cream diagonally and in which the tube leaves the bottle at the side of the cap in order to provide a means whereby the siphoning may be started by merely tipping the bottle, whereas in former devices if the bottle were tipped it would have to be tipped so far that the cream would be disturbed.

With these and other objects in view the invention consists in the construction, the combination, the detail, and arrangement of parts as hereinafter more fully described and claimed.

In the drawings:

Fig. 3 is a view of Fig. 1 in which the bottle has been tipped.

Fig. 4 is a section at 4—4 of Fig. 3.

Fig. 5 is a modified form of the lower tube shown in Figs. 1 and 3.

Figs. 6, 7 and 8 are plan views of the three disks forming the bottle cap.

In the embodiment of this invention there is provided a siphon tube 2 terminating in a J tube in the interior of the bottle 3 and passing through and affixed to a stopper 4, the said siphon tube entering at one side of said stopper and passing at an angle therethrough so that the mouth of the said J tube is in juxtaposition to the opposed side of said bottle from which the said tube enters. The said stopper is made up of the following parts: A handle A, a metallic top disk B, a compressible disk C and a metallic lower disk D, the said members being held together by a screw E. The J tube is expanded at its upper end and carries a packing gland F, which gland is held in place by lugs G.

Figure 1:
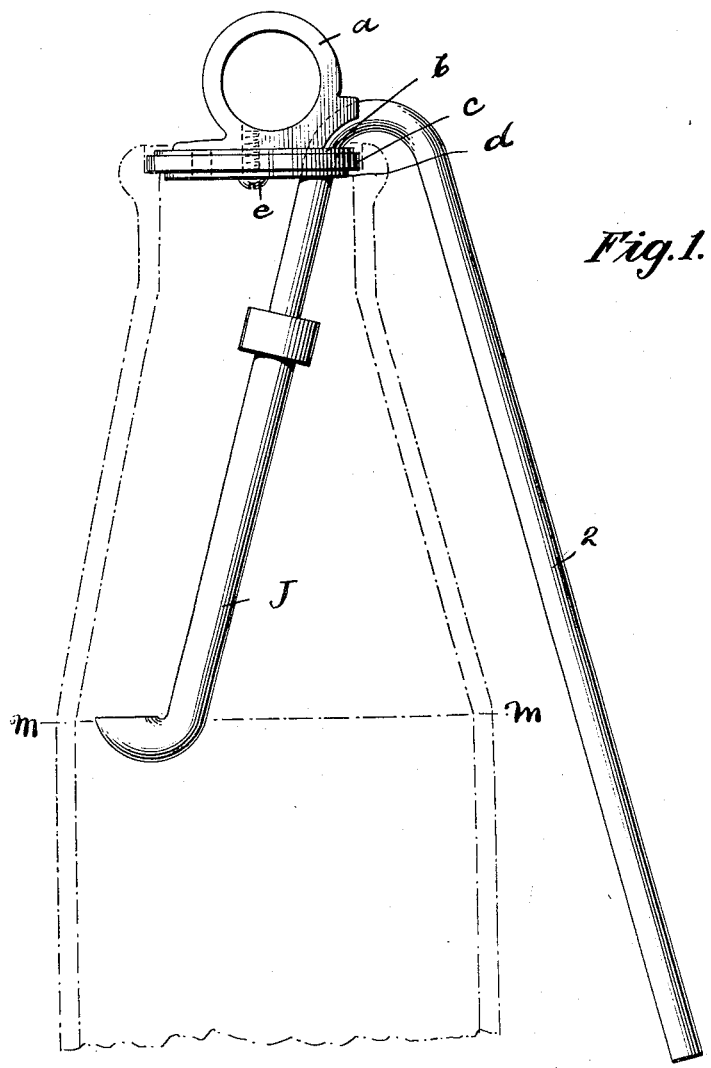
Figure 1 is a longitudinal section medial through an ordinary milk bottle provided with the invention herein.
Figure 2:
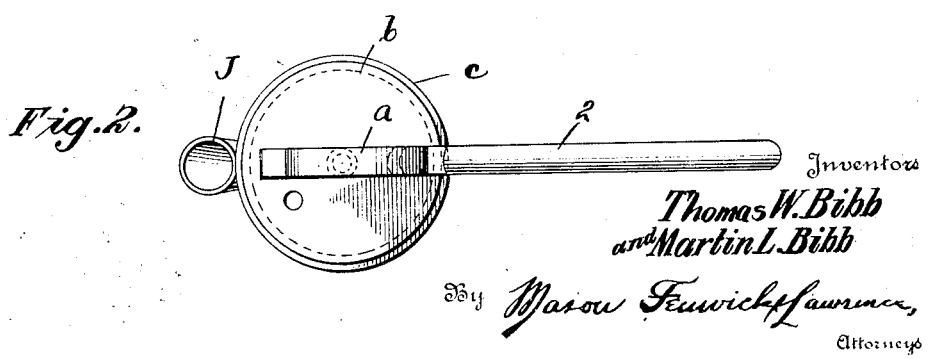
Fig. 2 is a plan view of our device.

As shown in Fig. 1, the milk bottle is standing vertically and the dividing line between the milk and the cream is indicated by the dotted line M—M. As the bottle is shown in the tipped position in Fig. 3, the dividing line between the milk and cream is shown by the dotted line M—M passing through said bottle at an angle to the position shown in Fig. 1.

In operation, in order to start the siphoning of the cream, all that is necessary is to tip the bottle, which will start the cream to flowing by gravity, as for instance, when it is tipped to the position shown in Fig. 3, the mouth of the J tube will still be in the cream and gravity will start the flow of the cream and the siphon effect is started. It is therefore quite obvious that owing to the angularity at which the siphon tube passes through the bottle and its positioning in the bottle that the cream will start to flow when the bottle is so tipped without the milk flowing therewith, and also that this siphoning may be started without such commonly used methods of starting siphoning, as a pressure system, and that all that is necessary in the applying of this device to a milk bottle is to insert the stopper in the milk bottle and tip the milk bottle to start the siphoning. It will be noted further that the end of pipe 2 is always within the cream, and that when the suction ceases, the flow automatically ceases, and since the mouth of the J tube is always at substantially the dividing line between the milk and the cream, the cream will be exhausted when this flow ceases. It is further obvious that the housewife may, after first tipping the bottle and then righting it, leave the bottle to itself and allow the cream to automatically run out slowly in its course.

What we claim is:

In a siphoning device the combination of a tiltable container having a mouth, a closure for the mouth having a vent hole, and a siphon tube having its short leg passing through and secured to the closure adjacent one side at an angle so that its open end will be located adjacent the wall of the container on the opposite side whereby the tilting of the container will cause a preliminary gravity flow of its contents through the siphon without spilling or agitating the contents.

In testimony whereof we affix our signatures.

THOMAS W. BIBB.
MARTIN L. BIBB.